(12) United States Patent
Blair (10) Patent No.: US 7,926,831 B2
(45) Date of Patent: Apr. 19, 2011

(54) FOLDING CARGO DECK ASSEMBLY FOR A FIFTH-WHEEL TRUCK

(75) Inventor: Mark Blair, Stanton, IA (US)

(73) Assignee: Brandy M. Blair, Stanton, IA (US)

( * ) Notice: Subject to any disclaimer, the term of this patent is extended or adjusted under 35 U.S.C. 154(b) by 136 days.

(21) Appl. No.: 12/386,727

(22) Filed: Apr. 22, 2009

(65) Prior Publication Data

US 2010/0270784 A1    Oct. 28, 2010

(51) Int. Cl.
    *B60P 1/64* (2006.01)
(52) U.S. Cl. ..................... 280/418.1; 280/769
(58) Field of Classification Search .................. 280/656, 280/727, 760, 762, 764.1, 769; 414/462, 414/465, 466; 296/182.1, 184.1
    See application file for complete search history.

(56) References Cited

U.S. PATENT DOCUMENTS

| | | | | |
|---|---|---|---|---|
| 2,442,889 A | * | 6/1948 | Deal | 296/3 |
| 2,653,685 A | * | 9/1953 | Buck | 187/243 |
| 2,682,957 A | * | 7/1954 | Holmes | 212/300 |
| 3,257,760 A | | 6/1966 | Calthorpe | |
| 3,378,156 A | | 4/1968 | Hunton | |
| 3,624,786 A | * | 11/1971 | Lundahl | 414/475 |
| 3,841,690 A | * | 10/1974 | Piercy | 296/10 |
| 3,884,526 A | | 5/1975 | Sweet et al. | |
| 3,889,432 A | | 6/1975 | Geihl | |
| 3,901,398 A | | 8/1975 | Bunch | |
| 4,020,957 A | | 5/1977 | Wren | |
| 4,078,818 A | * | 3/1978 | Donnelly | 280/418.1 |
| 4,141,568 A | * | 2/1979 | Donnelly | 280/418.1 |
| 4,265,463 A | | 5/1981 | Perruso | |
| 4,418,954 A | * | 12/1983 | Buckley | 296/100.09 |
| 4,598,925 A | | 7/1986 | Riggin | |
| 4,647,270 A | * | 3/1987 | Maloney | 414/470 |
| 4,678,391 A | | 7/1987 | Mooney | |
| 4,732,420 A | | 3/1988 | O'Neil et al. | |
| 4,746,261 A | | 5/1988 | Landoll et al. | |
| 4,786,073 A | * | 11/1988 | Harper | 280/656 |
| 4,918,772 A | | 4/1990 | Haile | |
| 4,930,799 A | * | 6/1990 | Pihlstrom et al. | 280/400 |
| 4,932,703 A | * | 6/1990 | Chamberlin et al. | 296/26.08 |
| 4,934,895 A | | 6/1990 | Thibodeaux | |
| 4,969,690 A | | 11/1990 | Smith | |
| 5,173,028 A | | 12/1992 | Heikkinen et al. | |
| 5,183,282 A | * | 2/1993 | Smyly, Sr. | 280/414.1 |
| 5,263,807 A | * | 11/1993 | Pijanowski | 414/480 |
| 5,388,949 A | | 2/1995 | Berg | |
| 5,432,963 A | | 7/1995 | Coral et al. | |
| 5,775,868 A | | 7/1998 | Mann | |
| 5,829,945 A | | 11/1998 | Stanley | |
| 5,951,095 A | | 9/1999 | Herndon | |
| 5,961,173 A | * | 10/1999 | Repetti | 296/37.6 |
| 6,199,894 B1 | * | 3/2001 | Anderson | 280/638 |
| 6,257,639 B1 | * | 7/2001 | Walsh | 296/26.11 |
| 6,349,865 B1 | | 2/2002 | Tolley et al. | |

(Continued)

*Primary Examiner* — J. Allen Shriver, II
*Assistant Examiner* — Brodie Follman
(74) *Attorney, Agent, or Firm* — Dennis L. Thomte; Thomte Patent Law Office LLC (57) ABSTRACT

A folding deck assembly is provided which is mounted on a fifth wheel truck rearwardly of the cab of the truck. The folding cargo deck assembly may be selectively moved from a stowed position rearwardly of the cab of the truck to a position which extends rearwardly from the cab so that the cargo deck assembly may support cargo thereon when the truck is not being used to pull a trailer.

4 Claims, 7 Drawing Sheets

U.S. PATENT DOCUMENTS

| | | | |
|---|---|---|---|
| 6,443,476 B1 * | 9/2002 | Molock, Jr. | 280/507 |
| 6,447,226 B1 * | 9/2002 | Andre | 410/29.1 |
| 6,547,506 B1 * | 4/2003 | Jacob | 414/498 |
| 6,623,028 B1 * | 9/2003 | Johnston | 280/656 |
| 6,644,704 B1 | 11/2003 | Nyberg | |
| 6,834,882 B1 * | 12/2004 | Boyd | 280/656 |
| 6,957,847 B2 * | 10/2005 | Rigel | 296/190.02 |
| 7,100,933 B2 | 9/2006 | Zackovich et al. | |
| 7,281,744 B1 * | 10/2007 | Schultz et al. | 296/26.07 |
| 7,320,494 B1 * | 1/2008 | Wilson | 296/100.09 |
| 7,338,077 B2 * | 3/2008 | Richard | 280/769 |
| 7,401,860 B2 * | 7/2008 | Kraenzle | 298/12 |
| 7,780,185 B2 * | 8/2010 | McConkey et al. | 280/656 |
| 2004/0032142 A1 * | 2/2004 | Sherrer et al. | 296/61 |
| 2004/0231963 A1 * | 11/2004 | Colby | 198/500 |
| 2005/0280272 A1 * | 12/2005 | Vokey et al. | 296/25 |
| 2009/0311044 A1 * | 12/2009 | Groeneweg et al. | 404/6 |

* cited by examiner

FOLDING CARGO DECK ASSEMBLY FOR A FIFTH-WHEEL TRUCK

BACKGROUND OF THE INVENTION

1. Field of the Invention

This invention relates to a folding cargo deck assembly for a truck and more particularly to a folding cargo deck for an over-the-highway truck or tractor having a fifth wheel to which a trailer is normally attached.

2. Description of the Related Art

Over-the-highway tractor trucks, semi-trucks or tractors have a pair of frame rails which extend in a longitudinal fashion and which have a fifth wheel mounted thereon to which a trailer is attached by means of a king pin. Frequently, the truck delivers an attached trailer to a location at some distance from the home base of the truck operator with the trailer being left at that location. If the operator does not have a trailer to pull back to the operator's home base or some other destination, the truck is unable to transport cargo on the return trip since the truck is not designed to haul cargo other than when cargo is contained within or on a trailer attached to the fifth wheel of the truck.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The folding cargo deck assembly of this invention is designed to be used with a truck including a wheeled frame means having first and second longitudinally extending frame rails with forward and rearward ends. The truck also has a cab, having forward and rearward ends, mounted on the wheeled frame means at the forward end thereof. Additionally, the truck has a fifth wheel mechanism positioned between the first and second frame rails forwardly of the rearward ends thereof.

The folding cargo deck assembly of this invention includes an upstanding support structure secured to the frame rails behind the truck cab. A first cargo deck member having a forward end, a rearward end, a first side, a second side, an upper surface and a bottom surface. The first cargo deck member is pivotally secured, about a horizontal axis, at its forward end to the support structure. The first cargo deck member is movable between a first substantially vertically disposed position to a second substantially horizontally disposed position over the first and second frame rails.

The folding cargo deck assembly of this invention also includes a second cargo deck member having a forward end, a rearward end, a first side, a second side, an upper surface and a bottom surface. The second cargo deck member is pivotally secured, about a horizontal axis, at its forward end to the rearward end of the first cargo deck member. The second cargo deck member is pivotally movable between a first position and a second position with respect to the first cargo deck member. The second cargo deck member, when in its first position, and the first cargo deck member is in its first position, is positioned between the first cargo deck member and the rearward end of the cab. The second cargo deck member, when in its first position, and the first cargo deck member is in its second position, is positioned above the first cargo deck member. The second cargo deck member, when in its second position, and the first cargo deck member is in its second position, extends generally horizontally rearwardly from the rearward end of the first cargo deck member. The first and second cargo deck members are operatively supported upon the first and second frame rails when in their second positions.

Means is also provided for pivotally moving the first cargo deck member between its first and second positions. Means is also provided for locking the first cargo deck member in its first position adjacent the rearward end of the cab. Additionally, means is provided for securing the second cargo deck member to the first and second frame rails when the first and second cargo deck members are in their second positions.

The cargo deck members are positioned rearwardly of the cab in a substantially vertically disposed position when the truck is being used to pull a trailer. When the truck is not being used to pull a trailer but it is desired to be able to enable the truck to haul cargo, the first and second cargo deck members are lowered onto the frame rails and secured thereto so as to be able to support cargo thereon.

It is therefore a principal object to provide a folding cargo deck assembly for a truck.

A further object of the invention is to provide a folding cargo deck assembly for a truck which has a fifth wheel assembly.

A further object of the invention is to provide a folding cargo deck assembly of the type described which includes means for locking the cargo deck members in a stowed position behind the rearward end of the truck cab.

A further object of the invention is to provide a folding cargo deck assembly for a truck having a fifth wheel which when in their stowed positions do not interfere with the normal operation of the truck.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional truck commonly referred to as an over-the-highway tractor truck, a semi-truck, tractor, etc. Truck 10 includes a wheeled frame means 12 which includes longitudinally extending frame rails 14 and 16. Truck 10 includes a cab 18 having a rearward end 20. For purposes of description, truck 10 will be described as having a forward end 22, a rearward end 24, a first side 26 and a second side 28. As seen, the truck 10 includes a conventional fifth wheel assembly 30 secured to and positioned between frame rails 14 and 16 in conventional fashion.

Figure 7:
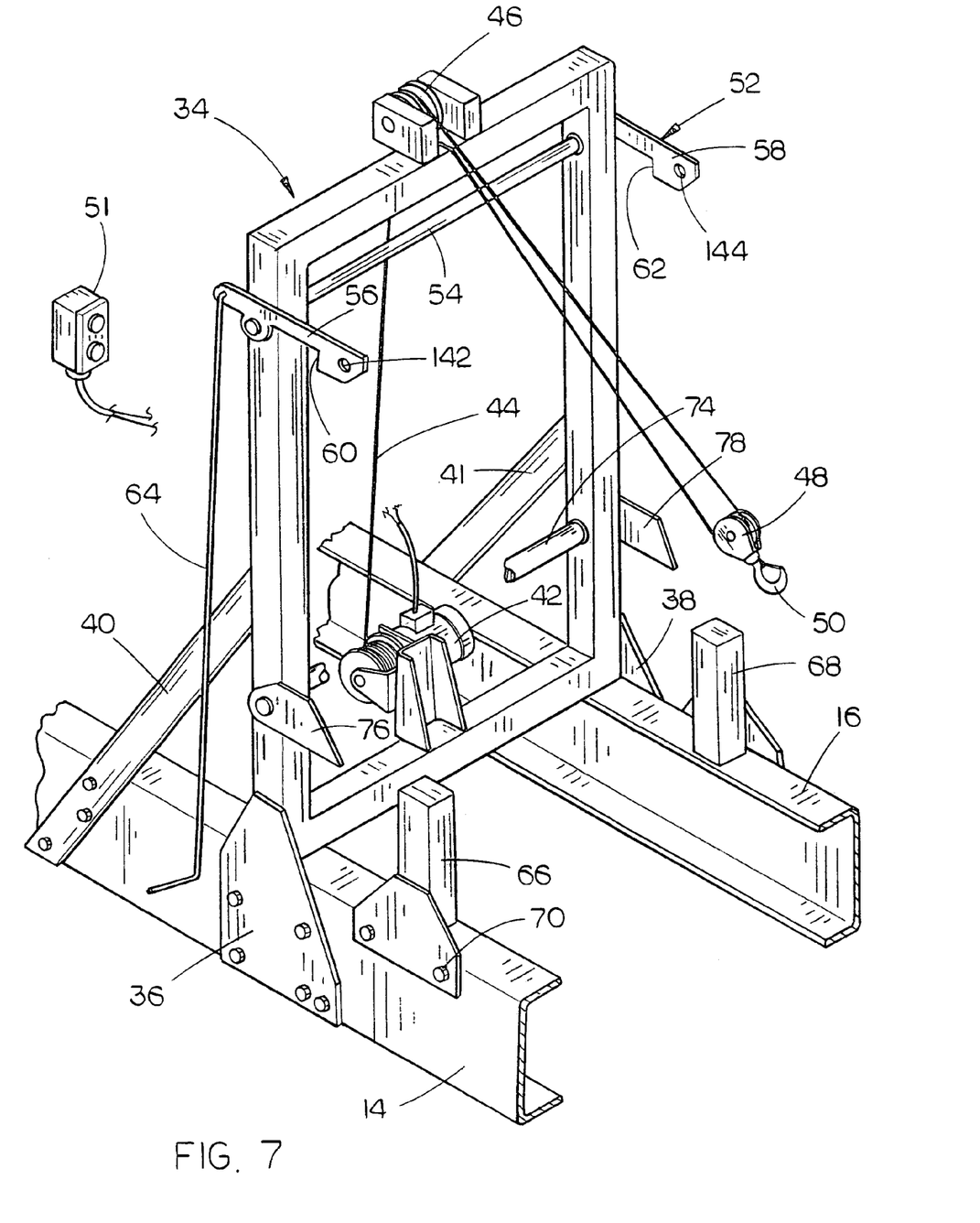
FIG. 7 is a partial perspective view illustrating the support structure of the cargo deck assembly.

The folding cargo deck assembly of this invention is referred to by the reference numeral 32. Assembly 32 includes a support structure 34 with the lower opposite sides thereof being secured to the frame rails 14 and 16 by means of the plates 36 and 38 being bolted thereto respectively. Preferably, the support structure 34 includes braces 40 and 41 which are bolted to frame rails 14 and 16 respectively. An electric reversible winch 42 is mounted on support structure 34 and has a winch cable 44 extending therefrom which passes around a pulley or sheave 46 which is rotatably mounted at the upper end of support structure 34. The winch cable 44 extends around a pulley 48 having a hook 50 secured thereto with the end of winch cable 44 being fixed to support structure 34 as seen in FIG. 7. Winch 42 is controlled by a control panel 51. A latching or locking assembly 52 is mounted on support structure 34 and includes a rotatably shaft 54 having latch members 56 and 58 mounted on the opposite ends thereof for rotation therewith. Latch members 56 and 58 include downwardly depending hooks 60 and 62 respectively. An elongated actuator rod 64 is pivotally secured to the forward end of latch member 56 to enable latch members to be pivotally movable between latched and unlatched positions as will be described in more detail hereinafter.

A pair of post members 66 and 68 are selectively removably secured to frame rails 14 and 16 respectively by bolts 70 and 72 respectively. Rod 74 is rotatably mounted on support structure 34 and has plates 76 and 78 fixed to the opposite ends thereof for rotation therewith.

The numeral 80 refers to a metal folding cargo deck which is comprised of a first cargo deck member 82 and a second cargo deck member 84. For purposes of description, cargo deck member 82 will be described as having a forward end 86, a rearward end 88, a first side 90, a second side 92, an upper surface 94 and a bottom surface 96. The forward end 86 of cargo deck member 82 is fixed to the plates 76 and 78 by welding or the like. Cargo deck member 82 is provided with openings 98, 100, 102, 104 and 106 formed therein. The bottom surface 96 of cargo deck has a pair of downwardly depending support members 108 and 110 secured thereto, which have outwardly extending portions 112 and 114 to provide clearance for the fifth wheel 30. In some cases, the support members 108 and 110 will not be needed.

For purposes of description, cargo deck member 84 will be described as including a forward end 116, a rearward end 118, a first side 120, a second side 122, an upper surface 124 and a bottom surface 126. A pair of elongated and spaced-apart supports 128 and 130 extend downwardly from the bottom surface 126 of cargo deck member 84. In some cases, the supports 128 and 130 will not be needed. The upper forward end 116 of cargo deck member 84 is pivotally secured to the upper rearward end of cargo deck member 82 by hinges 132. Clevis 134 is pivotally secured to the rearward end of cargo deck member 84. Cargo deck member 84 is provided with a pair of openings 136 and 138 formed therein.

Figure 1:
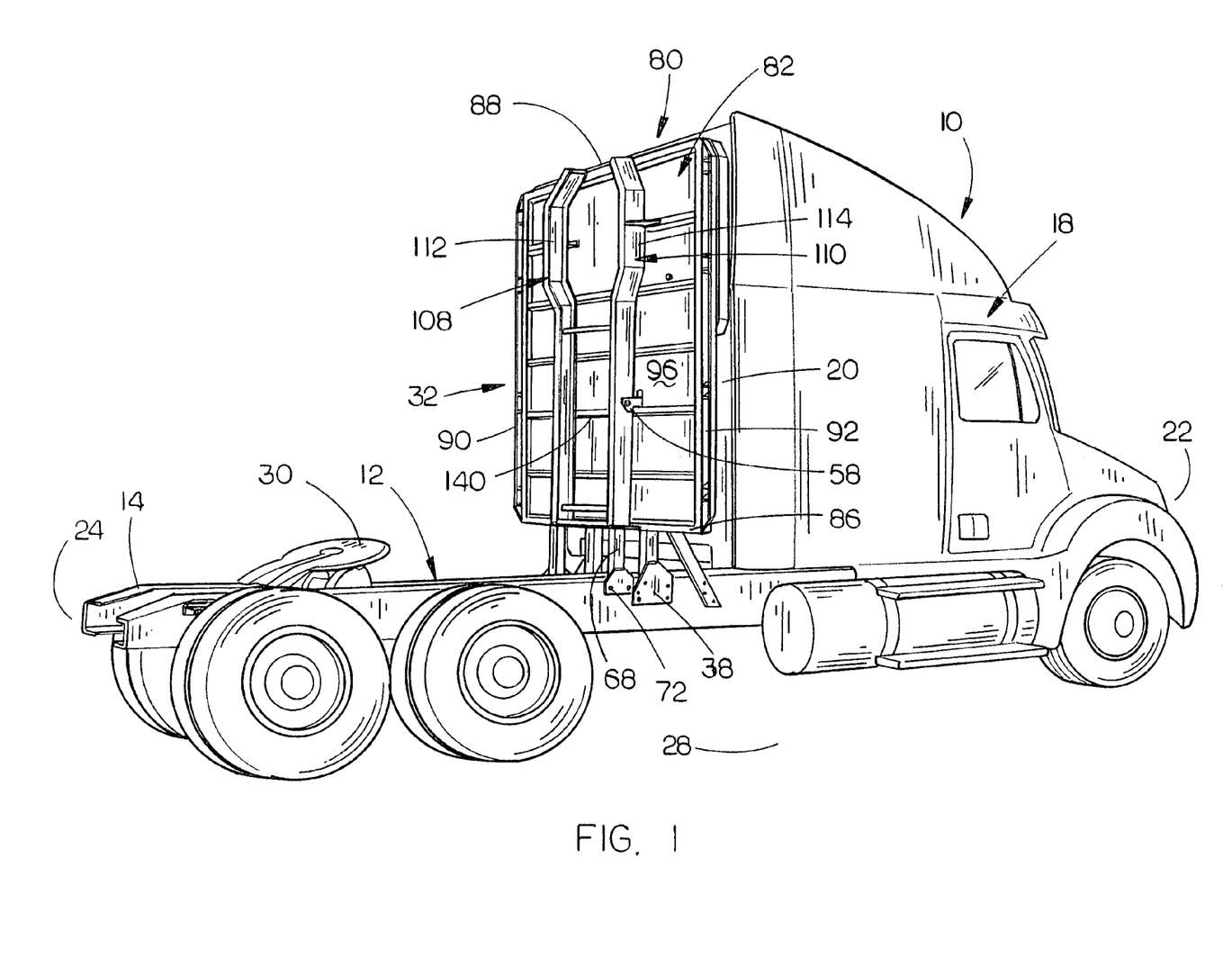
FIG. 1 is a rear perspective view of a conventional fifth wheel truck having the folding cargo deck assembly of this invention positioned in a stowed position behind the rearward end of the cab.
Figure 2:
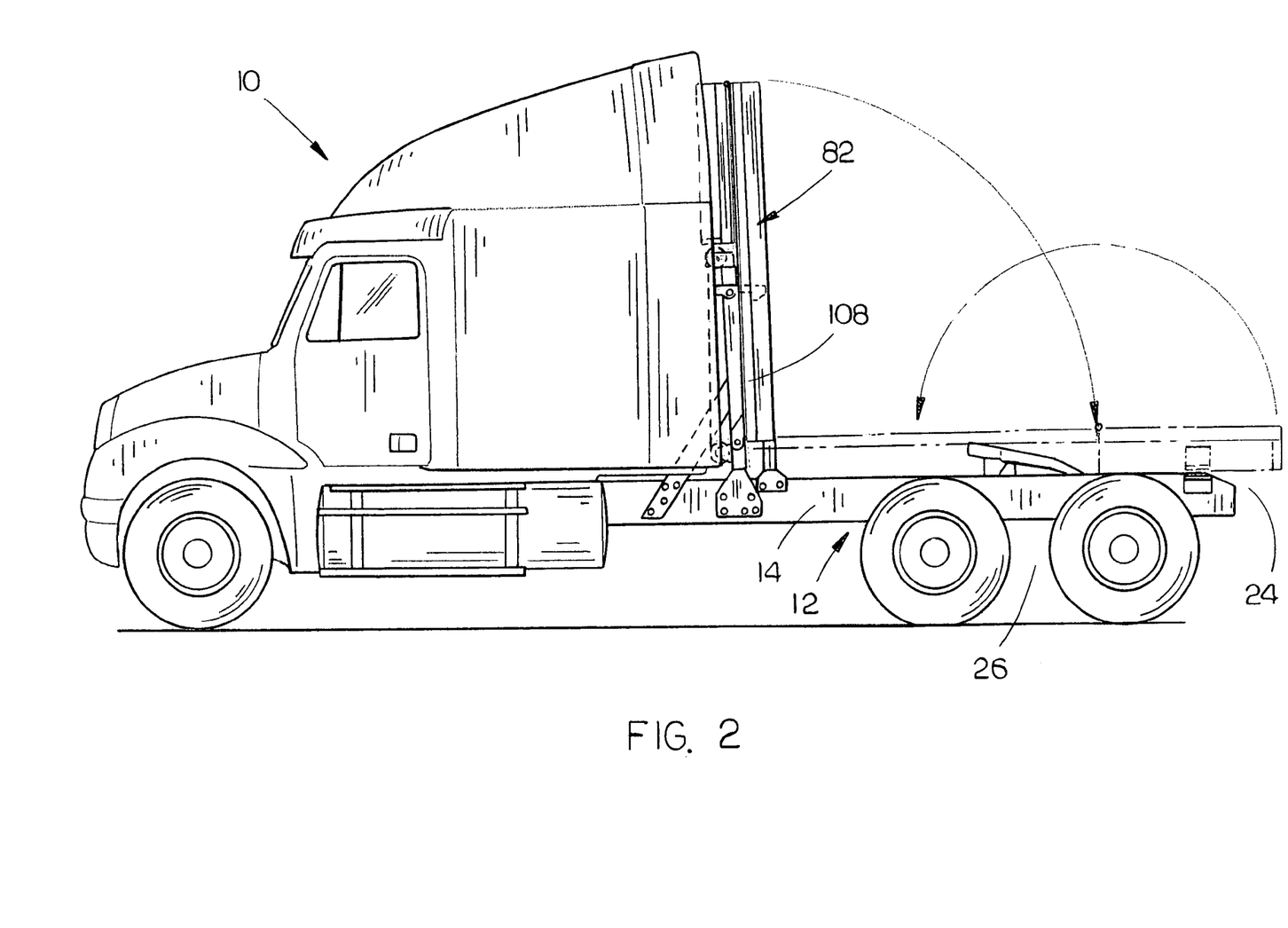
FIG. 2 is a side view of the truck of FIG. 1 with the cargo deck assembly in its stowed position and with the broken lines indicating the cargo deck assembly in its cargo hauling position.

Assuming that the folding cargo deck 80, including cargo deck members 82 and 84, are in their stowed or first position closely adjacent the rearward end of the cab 18, post members 66 and 68 are secured to the frame rails 14 and 16 so that the upper ends thereof are in close engagement with forward end 86 of cargo deck member 82 which prevents the cargo deck members from pivotally moving downwardly and rearwardly from the position of FIG. 1. In other words, the post members 66 and 68 act as a safety mechanism. A further safety mechanism is the fact that the latch members 56 and 58 extend rearwardly through openings 98 and 100 in cargo deck member 82 so that the hooks 60 and 62 thereof respectively extend over a cross member 140 secured to the bottom surface 94 of cargo deck member 82. If needed, bolts may be extended through the openings 142 and 144 of the latch members 56 and 58 respectively and extended through the supports 112 and 114 respectively for a further safety measure. Additionally, a bolt B may be extended through the registering openings 104 and 136 of cargo deck members 82 and 84 respectively and a bolt B may be extended through the registering openings 106 and 138 of cargo deck members 82 and 84 respectively to maintain the cargo deck member 84 in its first position closely adjacent the upper surface of the cargo deck member 82.

In the position of FIG. 1, the folding cargo deck assembly 32 does not interfere with the normal operation of the truck when the truck is pulling a trailer connected to a fifth wheel 30.

Figure 4:
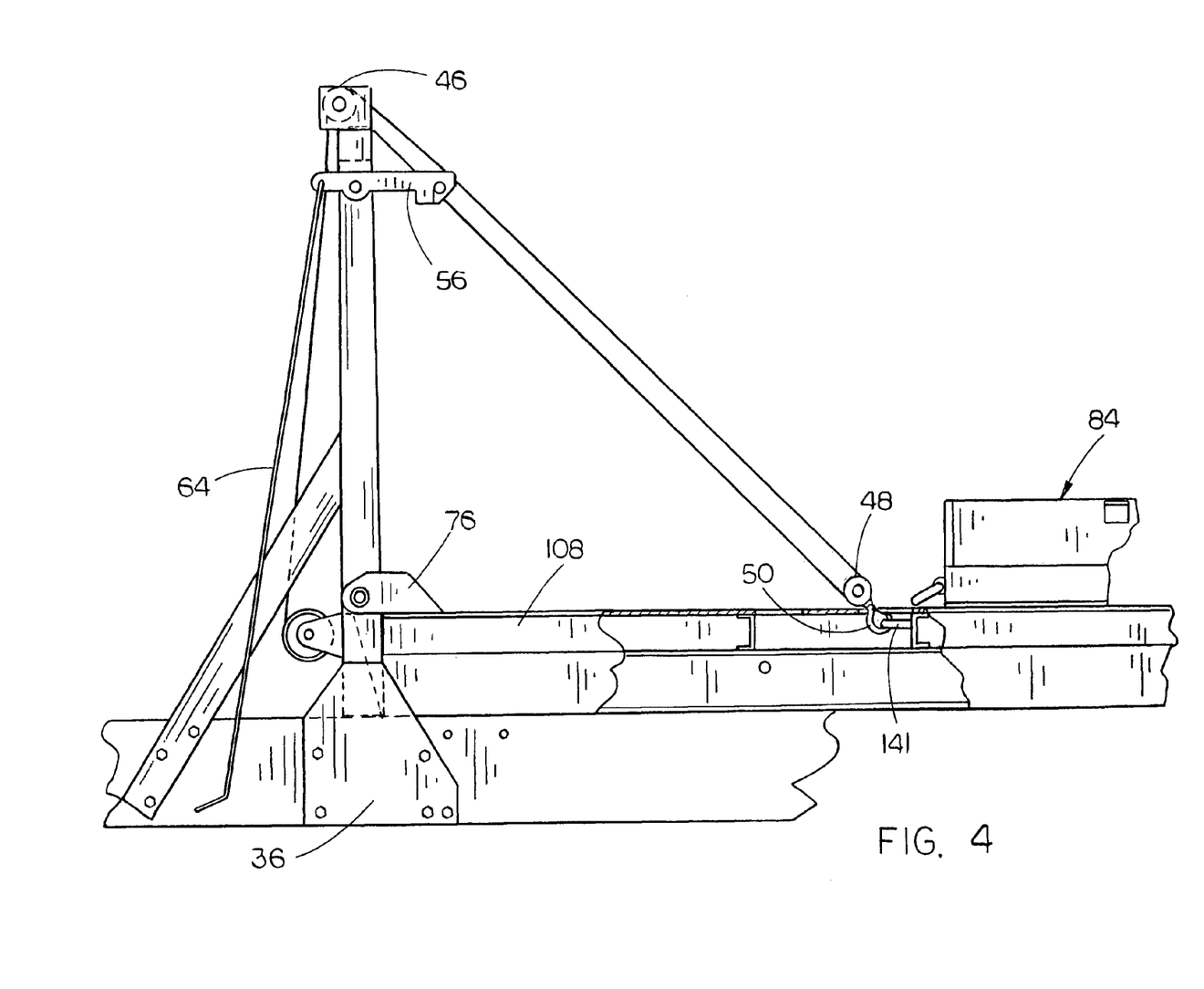
FIG. 4 is a partial side view of the support structure for the cargo deck assembly with the first cargo deck member being in its second position and the second cargo deck being in its first position.

When it is desired to utilize the folding cargo deck assembly 32, the post members 66 and 68 are removed from the frame rails 14 and 16 respectively. If the latch members 56 and 58 have been bolted to the supports 112 and 114, those bolts are also removed. Prior to the removal of the post members 66 and 68 from the frame rails 12 and 14, the hook 50 would have been extended through the opening 102 in the cargo deck assembly 82 and connected to a clevis 141 which is secured to one of the cross members of the cargo deck member 82 as illustrated in FIG. 4. Normally, the hook 50 would have been connected to the clevis 42 at the time that the cargo deck members 82 and 84 were moved to their stowed position behind the vehicle cab. The actuator rod 64 is then moved downwardly to cause the rearward ends of the latch members 56 and 58 to pivot upwardly out of engagement with the cross member 140.

Figure 3:
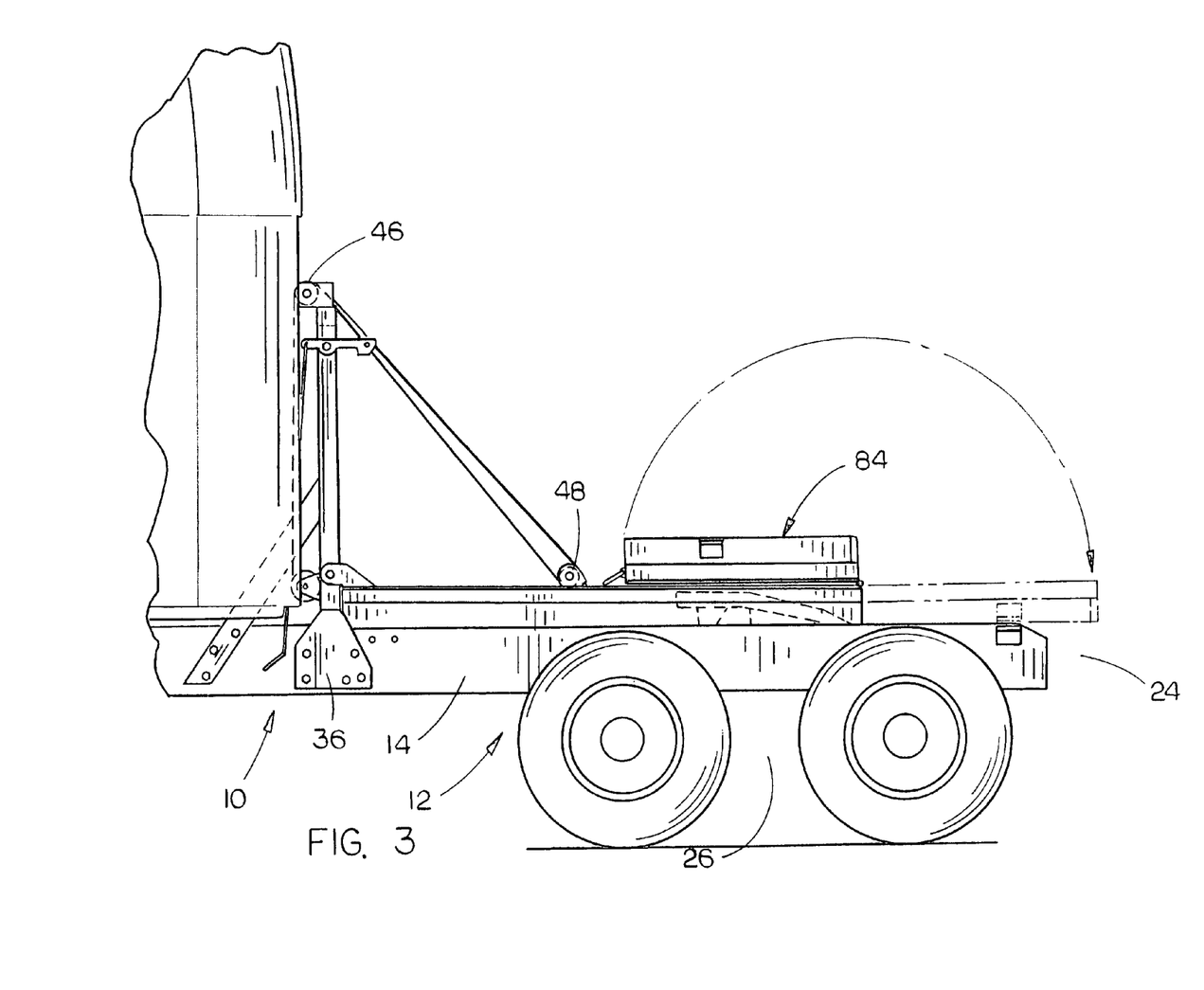
FIG. 3 is a partial side view similar to FIG. 2 but which shows the first cargo deck member having been lowered to its second position with the second cargo deck member still being positioned on the first cargo deck member and with the broken lines illustrating the second cargo deck member being pivoted to its cargo hauling position.
Figure 6:
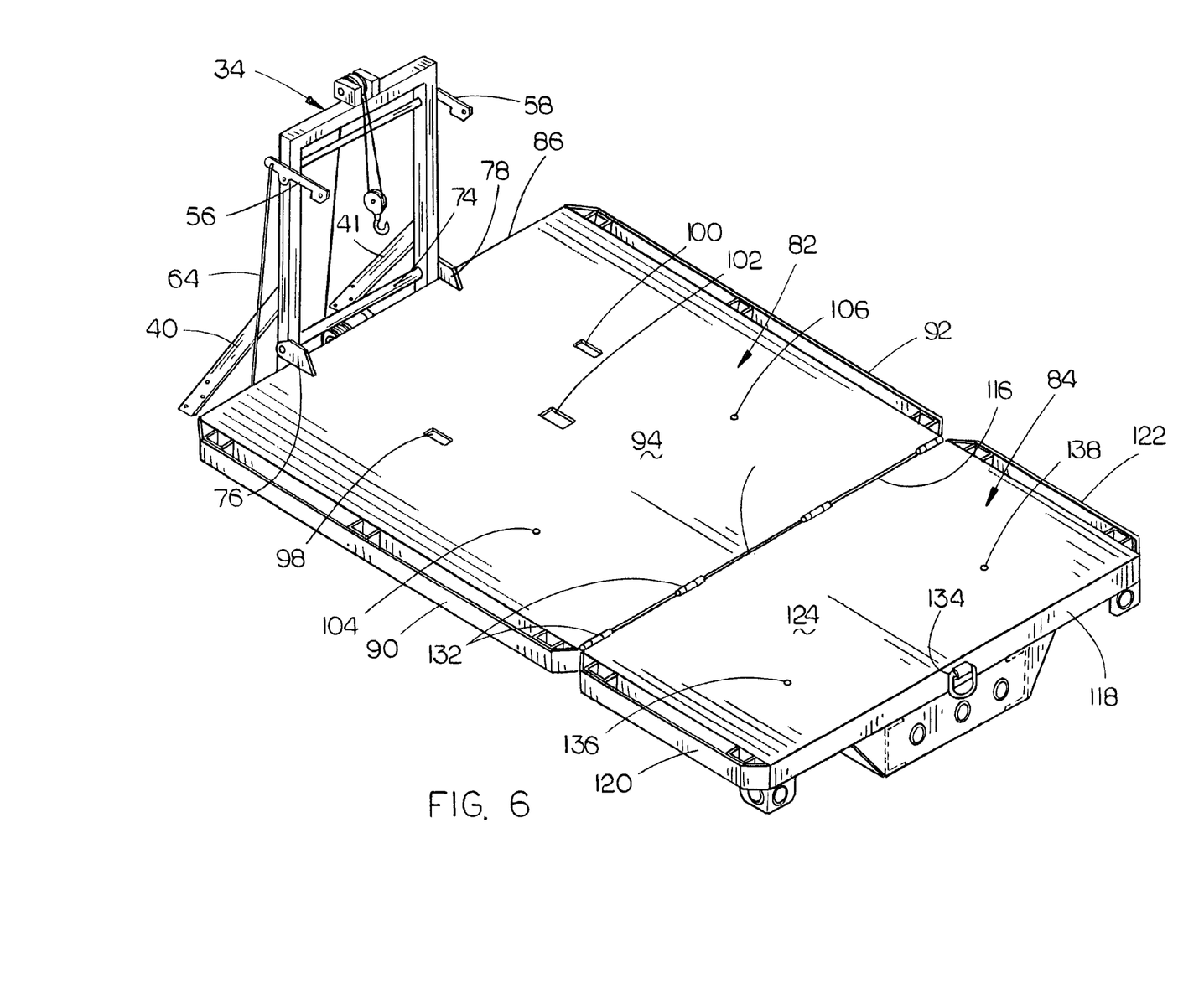
FIG. 6 is a rear perspective view illustrating the support structure for the cargo deck members which are illustrated in their cargo hauling or second positions.

The electric winch 42 is then operated to permit the winch cable 44 to unwind from the winch 42 so that the cargo deck members 82 and 84 are lowered to the position of FIG. 3 with the cargo deck member 82 being in its second position and with the cargo deck member 84 still being in its first position. At that time, the bolts B are removed from the openings 104, 136 and 106, 138 so that the cargo deck member 84 may be pivotally moved from the position illustrated by the solid lines in FIG. 3 to the position in broken lines in FIG. 3. The bolts B are then extended through the openings 136 and 138 and are connected to brackets 144 and 146 which are connected to the frame rails 14 and 16 to maintain the cargo deck members 82 and 84 in their horizontally disposed cargo hauling position. The hook 50 is then disengaged from the clevis 142 with the winch cable 44 being wound onto the real or drum of the winch 42 as seen in FIG. 6. As previously stated, the cargo deck member 84 is moved from its first position on top of the cargo deck member 82 to its horizontally extending position and that movement is normally accomplished by connecting a fork lift truck or the like in some fashion, such as by the clevis 134, to the cargo deck member 84, in as much as means is not provided for pivoting the cargo deck member 84 with respect cargo deck member 82.

If support members 108 and 110 and supports 128 and 130 are utilized, those support members and supports will rest on the frame rails 14 and 16. If the support members 108 and 110 and supports 128 and 130 are not utilized, the bottoms of cargo deck members 82 and 84 will rest on the frame rails 14 and 16.

Figure 5:
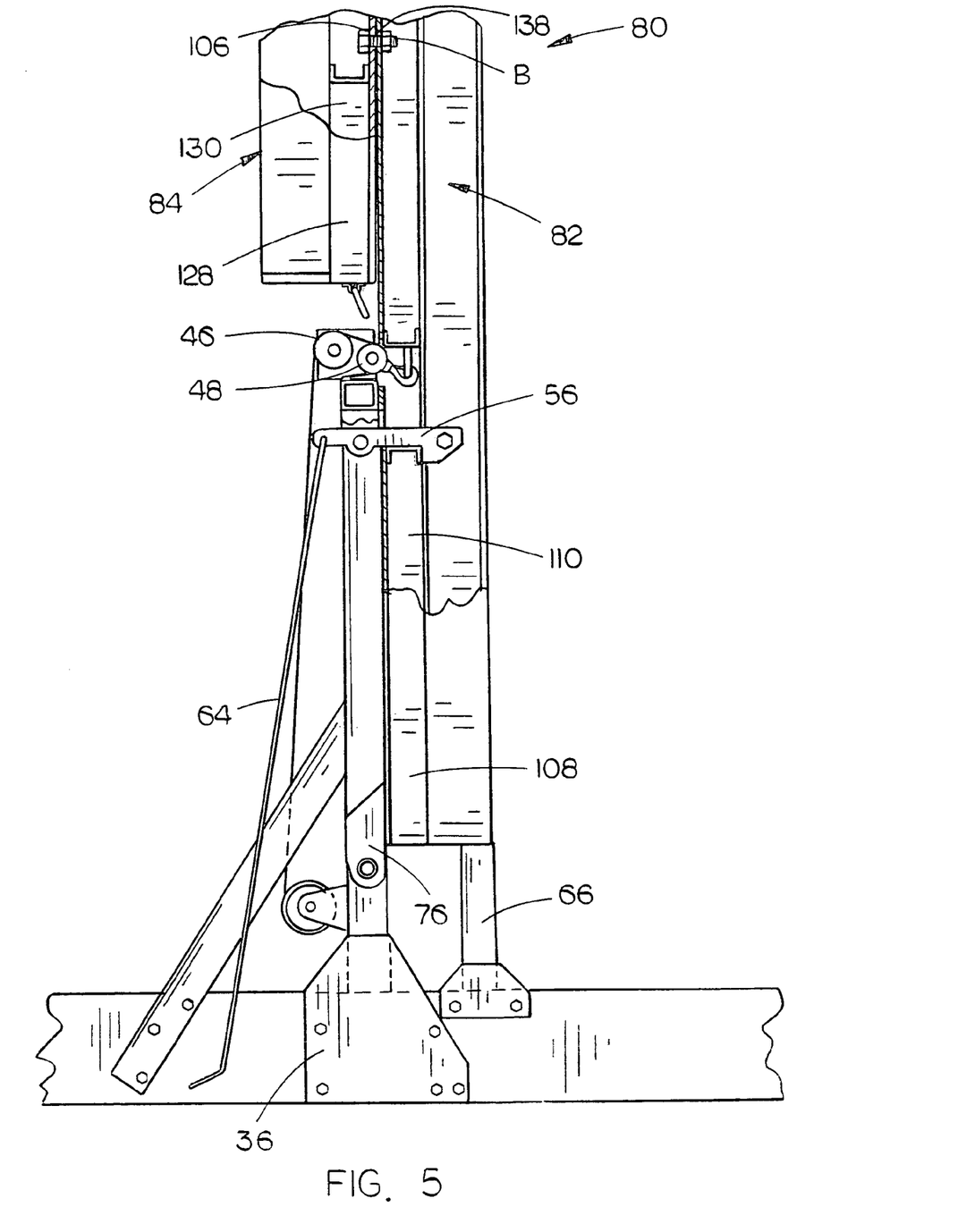
FIG. 5 is a side view illustrating the relationship of the first and second cargo deck members with respect to the support structure therefore with the cargo deck members being in their stowed positions.

Cargo may then be placed on the cargo deck members 82 and 84 and tied down by use of the rails at the sides of the cargo deck members. The truck may then transport the cargo to the desired location. When the cargo has been removed from the cargo deck members 82 and 84, the bolts B are removed from the openings 136 and 138 by disconnecting the same from the brackets 144 and 146 respectively. The cargo deck member 84 is then pivotally moved about the hinges 132 so that it is in the position of FIG. 3 on top of the cargo deck member 82. At that time, the bolts B are extended through the registering openings 104, 136 and 108, 138. The hook 50 is then extended through the opening 102 and connected to the clevis 50 as seen in FIG. 4. The winch 42 is then operated to raise the cargo deck 80 from the position of FIG. 3 to the position of FIG. 5. The actuator rod 64 will then be moved upwardly to cause the latching members 56 and 58 to be in their locked positions such as illustrated in FIG. 5. The post members 66 and 68 are then reinstalled on the frame rails 14 and 16.

Thus, it can be seen that a novel folding cargo deck assembly has been provided which enables the truck to haul cargo thereon and which does not interfere with the operation of the truck when the truck is being used to pull a trailer or the like. It can therefore be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination:
a truck including a wheeled frame means including first and second longitudinally extending frame rails with forward and rearward ends, and a cab, having forward and rearward end, mounted on said wheeled frame means;
said truck having a fifth wheel mechanism positioned between said first and second frame rails forwardly of the rearward ends thereof;
an upstanding support structure, having upper and lower ends, secured to said frame rails rearwardly of the cab;
a first cargo deck member having a forward end, a rearward end, a first side, a second side, an upper surface and a bottom surface;
said forward end of said first cargo deck member being pivotally secured, about a horizontal axis, to said upstanding support structure;
said first cargo deck member being selectively movable between a substantially vertically disposed first position to a substantially horizontally disposed second position;
said first cargo deck member, when in its said second position, being positioned over said first and second frame rails;
a second cargo deck member having a forward end, a rearward end, a first side, a second side, an upper surface and a bottom surface;
said forward end of said second cargo deck member being pivotally selectively secured, about a horizontal axis, to said rearward end of said first cargo deck member;
said second cargo deck member being movable between a first position and a second position with respect to said first cargo deck member;
said second cargo deck member, when in its said first position, being positioned between said first cargo deck member and said rearward end of said cab when said first cargo deck member is in its said first position;
said second cargo deck member, when in its said first position, being positioned above said first cargo deck member when said first cargo deck member is in its said second position;
said second cargo deck member extending generally horizontally rearwardly from said rearward end of said first cargo deck member when said second cargo deck member is in its said second position and said first cargo deck member is in its said second position;
said first and second cargo deck members being operatively supported upon said first and second frame rails when they are in their said second positions;
means for locking said first cargo deck member in its said first position;
said means for locking said first cargo deck member in its said first position comprises first and second post members secured to said first and second frame rails respectively which extend upwardly therefrom into engagement with said forward end of said first cargo deck member.

2. The combination of claim 1 wherein said post members are removably secured to said frame rails.

3. The combination of claim 1 wherein said means for locking also includes a latching lever assembly.

4. In combination:
a truck including a wheeled frame means including first and second longitudinally extending frame rails with forward and rearward ends, and a cab, having forward and rearward end, mounted on said wheeled frame means;
said truck having a fifth wheel mechanism positioned between said first and second frame rails forwardly of the rearward ends thereof;
an upstanding support structure, having upper and lower ends, secured to said frame rails rearwardly of the cab;
a first cargo deck member having a forward end, a rearward end, a first side, a second side, an upper surface and a bottom surface;
said forward end of said first cargo deck member being pivotally secured, about a horizontal axis, to said upstanding support structure;

said first cargo deck member being selectively movable between a substantially vertically disposed first position to a substantially horizontally disposed second position;

said first cargo deck member, when in its said second position, being positioned over said first and second frame rails;

a second cargo deck member having a forward end, a rearward end, a first side, a second side, an upper surface and a bottom surface;

said forward end of said second cargo deck member being pivotally selectively secured, about a horizontal axis, to said rearward end of said first cargo deck member;

said second cargo deck member being movable between a first position and a second position with respect to said first cargo deck member;

said second cargo deck member, when in its said first position, being positioned between said first cargo deck member and said rearward end of said cab when said first cargo deck member is in said first position;

said second cargo deck member, when in its said first position, being positioned above said first cargo deck member, when said first cargo deck member is in its said second position;

said second cargo deck member extending generally horizontally rearwardly from said rearward end of said first cargo deck member when said second cargo deck member is in its said second position and said first cargo deck member is in its said second position;

said first and second cargo deck members being operatively supported upon said first and second frame rails when they are in their said second positions;

and a latching lever assembly pivotally secured to said support structure which extends rearwardly therefrom for selective latching to said first cargo deck member when said first cargo deck member is in its said first position.

* * * * *